March 11, 1969    J. W. NELSON ET AL    3,432,638
APPARATUS FOR GUIDING ELECTRODES
Original Filed Oct. 20, 1965

INVENTORS
JEROME W. NELSON
WALLACE J. LEWIS

United States Patent Office 3,432,638
Patented Mar. 11, 1969

3,432,638
APPARATUS FOR GUIDING ELECTRODES
Jerome W. Nelson, Houston, Tex., and Wallace J. Lewis, Sacramento, Calif., assignors to The Battelle Development Corporation, Columbus, Ohio, a corporation of Delaware
Original application Oct. 20, 1965, Ser. No. 498,734, now Patent No. 3,328,556, dated June 27, 1967. Divided and this application June 16, 1967, Ser. No. 646,715
U.S. Cl. 219—125                             2 Claims
Int. Cl. B23k 9/12

ABSTRACT OF THE DISCLOSURE

An electrode guiding apparatus for automatic welding along a joint between metal plates having a welding head moveably mounted on a two-direction parallelogram linkage to allow horizontal and vertical movement of the head and having guide rods extending from the welding head into the joint to sense variations in joint depth and width and thereby maintain the proper contact-to-work distance at all times. The electrodes are moveably mounted within the welding head to maintain a selected lateral position with respect to the sidewalls of the joint.

This application is a divisional of our copending application Ser. No. 498,734, filed Oct. 20, 1965, now Patent No. 3,328,556, dated June 27, 1967.

Background of the invention

This invention relates to a guide apparatus for use in welding thick plate materials separated by a groove. In its broad aspects, the apparatus has application to all thick plate structures for downhand welding and for out-of-position welding. The apparatus of this invention provides floating action of the welding torch so that the contact tips are always properly positioned with respect to the bottom and sides of the grooved joint regardless of variations in the joint width or amount of fill from previous weld deposits. Prior guiding devices have employed parallelogram linkages in positioning welding heads but none of these devices are capable of maintaining a constant contact-to-work distance throughout the welding cycle, especially if several passes are necessary to fill a joint. The present invention is a unique application of a two-direction parallelogram linkage to provide a floating welding head that is directly responsive to guide means which ride in the joint and sense variations in joint width and depth. When shielding gas is used, the guide means of the present invention block the joint and thereby aid in retaining the gas in the weld zone.

The apparatus of this invention can be used for straight flat welds of abutting and T-members, e.g., joints or seams in flat and curved plates. Flat or curved plates may be welded in various positions and from various directions, vertical, horizontal, overhead, or otherwise.

The apparatus of this invention has wide flexibility. The apparatus can be used with one filler wire or with several filler wires. When using two filler wires the width of the joint gap can vary substantially and good sidewall fusion can be maintained. The filler wires are preferably positioned on opposite sides of the longitudinal center line of the joint with one filler wire guided along at a fixed distance from one joint edge and the other guided along at a fixed distance from the opposite joint edge. With this unique procedure the groove opening may vary and sidewalls fusion will be maintained.

When two filler wires are used, the filler wires may be connected to a single D-C power source or each electrode may be connected to separate D-C power sources. When a single D-C power source is used for more than one filler wire, the arc operates alternately from each electrode. Other variations may also be used. For example, one filler wire connected to a D-C power source and another connected to an A-C power source. Another example is to use three or more filler wires and connect them in many combinations. Connect one D-C source to two wires and one D-C source to the other or connect an A-C source to one wire and a D-C source to each of the other wires. The use of several filler wires and many different power sources are useable depending on the application, welding position, material, etc.

Summary

The present invention provides a guide apparatus for maintaining proper contact-to-work distance during automatic welding of joints between metal plates. The welding head is moveably mounted on a two-direction parallelogram linkage to allow the head to move both horizontally and vertically. The parallelogram is in turn mounted on a carriage which is moveable independently of the welding head. Guide rods extends from the welding head into the joint and transpose variations in joint width or depth into corresponding movement of the welding head, thus maintaining constant contact-to-work distance. The electrodes are moveably mounted within the welding head to maintain the electrodes at a selected lateral position with respect to the sidewalls of the joint. Further lateral positioning is achieved through a tracking roller which is attached to the welding head. The tracking roller bears on a guide bar which is positioned parallel to the joint and clamped in place on one of the plates.

One advantage of the present invention is to provide apparatus for automatically positioning the contact tube or tubes in a spaced relationship with respect to the sidewalls of the joint in spite of irregularities along the length of the joint.

A further advantage of this invention is that it allows satisfactory welds to be made in thick plate of ½-inch and up in all welding positions.

Further understanding of the invention can be accomplished by reference to the attached drawings, wherein.

Figure 1:
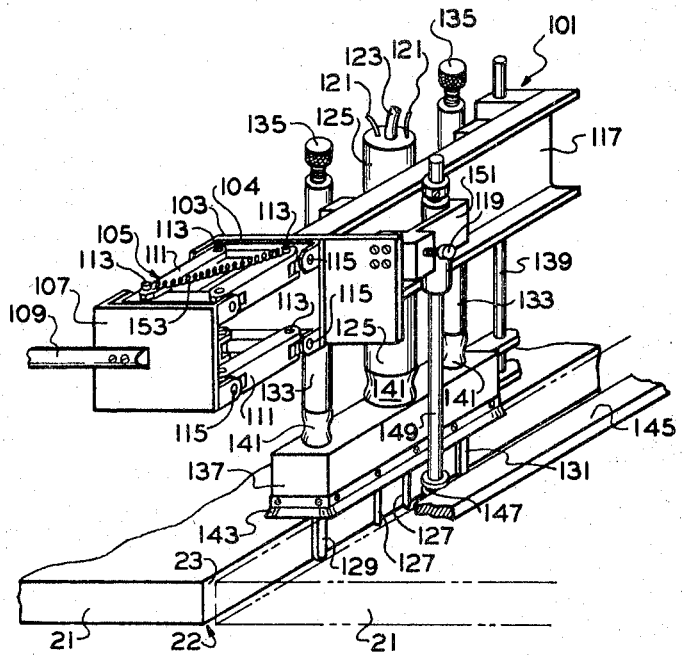
FIG. 1 is a prospective view of apparatus for maintaining the electrode in spaced relationship to the joint sidewalls.

In the drawings, the same reference numerals are applied to identical parts in all embodiments and such identically numbered parts are substantially identical in structure, function, and operation. Therefore, to eliminate confusing duplication, these parts, their interrelationship and their function will be described only in conjunction with a single embodiment, such description applying to all embodiments where these parts appear.

FIG. 1 shows the floating welding head apparatus of this invention. The welding head 101 has a plate 103 that is bolted to the plate 104 of a parallelogram mount 105 having a second plate 107 with a spindle 109 that is attachable to the carriage (not shown). The carriage carries the spools of filler wire and drives the welding head along the joint.

The parallelogram mount 105 includes four bars 111—111 mounted between plates 104 and 107 having pivots 113—113 at each end that allow plates 104 and 107 to move horizontally with respect to each other and pivots 115—115 that allow plates 104 and 107 to move vertically with respect to each other. Consequently, the welding head 101 may move horizontally or vertically in a plane parallel to plate 107.

The welding head 101 includes a frame 117 attached to the plate 103. The filler wires 121—121 and shielding gas tube 123 pass through a barrel 125 that is attached to the frame 117. The barrel 125 also supports contact tubes 127—127 positioned in the joint gap 22. Contact tubes 127—127 are used as originally machined or may be coated with a porcelain enamel or ceramic. The coating prevents the contact tube from shorting to the joint edges when welding narrow-gap openings.

The frame also supports a forward guide 129 and a rear guide 131 which are positioned in the gap 22 to ride on the bottom of the joint and maintain the contact-tube-to-work distance. The guides 129 and 131 are each positioned in a barrel 133 and are each adjustable by means of an adjustment screw 135.

In the preferred embodiment a shielding gas cup 137 is mounted to float with respect to the head 101 so that the cup is always riding against the top of the plates 21—21. The cup 137 is slideably mounted on a rod 139 affixed to frame 117. The shielding cup is also attached to barrels 125, 133—133 by means of flexible tubes 141. A flexible skirt 143 is also provided around the open end of cup 137. The above arrangement of shielding cup 137, guides 129 and 139, and contact tubes 127—127 provides three shielding gas chambers in the joint. A first chamber is positioned between guide 129 and the nearest contact tube 127; a second chamber is positioned between contact tubes 127—127; and a third chamber is positioned between guide 131 and the nearest contact tube 127. Thus, the entire weld area is enclosed in a moving, closed, gas chamber.

The welding head 101 is positioned laterally with respect to the joint by a bar 145 that serves as a guide for roller 147. The bar 145 is positioned parallel to the joint and clamped in place on one of the plates. The roller 147 is rotatably attached to a rod 149. The rod 149 is attached to a mount 151 slideably mounted on plate 103 and adjustable with respect to plate 103 by means of an adjusting screw 119. By turning screw 119 the distance between roller 147 and contact tubes 127—127 is adjustable to obtain the desired contact tip to joint sidewall spacing. The parallelogram mount 105 is biased by means of a spring 153 to hold the roller 147 against the guide bar 145.

The welding head 101 is moved along by the carriage (not shown) attached to plate 107 and is guided through the gap 22 by means of the roller 147 and guide bar 145 and the guides 129 and 131. When the apparatus is used for overhead welding, the head 101 is biased toward the "bottom" of the joint by means of counterweights (not shown) selected to maintain the guides 129 and 131 at a suitable pressure against the "bottom" of the joint. It is also possible to construct the welding head 101 so that each contact tube 127 is mounted separately and each provided with a separate roller 147 and guide bar 145 so that each contact tube is guided off a separate track or bar 145 positioned according to one sidewall 23 of the joint.

Figure 2:
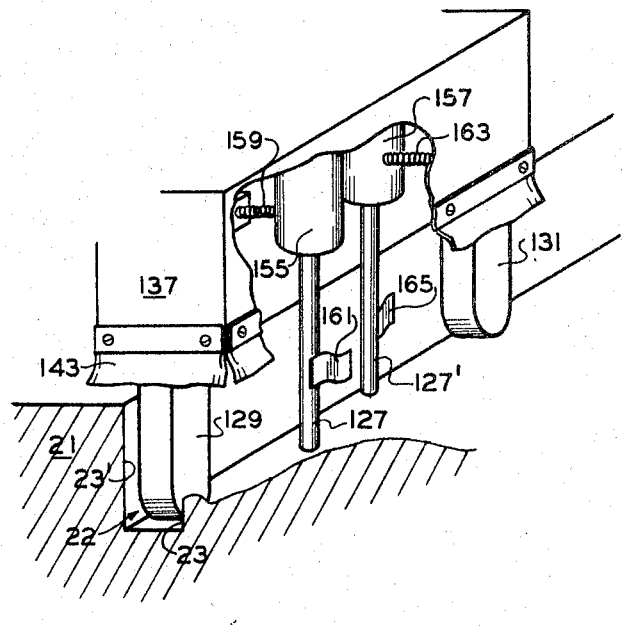
FIG. 2 is a sectional view through a joint showing another embodiment of apparatus for maintaining the electrode in spaced relationship to the joint sidewalls.

Another method of guiding the contact tubes with respect to the sidewalls 23—23 of the joint is shown in FIG. 2. The contact tubes 127—127′ are suspended from separate mounts 155 and 157. Mount 155 is provided with a means such as spring 159 that biases contact tube 127 toward sidewall 23. Contact tube 127 is provided with a spring clip 161 that contacts sidewall 23 and maintains the contact tube 127 a constant distance from sidewall 23 regardless of the irregularities of sidewall 23. Mount 157 is similarly biased with a spring 163 and contact tube 127′ provided with a spring clip 165 to maintain contact tube 127′ a constant distance from sidewall 23′. The spring contact tubes can be used in the parallelogram device previously described.

The apparatus of the present invention is especially useful in combination with apparatus for automatic narrow-gap welding of thick plate. Narrow-gap welding operates in the spray transfer range as contrasted to other automatic or semi-automatic gas-shielded metal-arc processes which operate in the droplet transfer, dip transfer or shorting-arc range to produce low heat inputs. Narrow-gap welding uses very low heat inputs, often as low as 7500 joules per inch per pass and up to about 30,000 joules per inch per pass with high deposition rates. In narrow-gap welding the electrodes are positioned in a narrow groove in close proximity (substantially 1/16 of one inch) to the joint sidewalls. It is extremely important to maintain the electrodes in a spaced relation with the sidewalls to prevent shorting or arcing to the sidewalls. The guide apparatus of this invention causes the welding head to continually adjust to variations in joint sidewalls and thus substantially decreases shorting or arcing during narrow-gap welding.

It will be understood, of course, that while the forms of the invention herein shown and described, constitute preferred embodiments of the invention, it is not intended to illustrate all possible forms of the invention. It will also be understood that the words used are words of description rather than of limitation and that various changes in shape, size, and arrangement of parts may be made without departing from the spirit and scope of the invention herein disclosed.

What is claimed is:

1. In apparatus for automatic welding along a joint between metal plates having a welding head and a moveable carriage, the improvement of:
    (a) a parallelogram attachment mechanically coupling the carriage and the welding head, said parallelogram attachment allowing said welding head to move vertically and horizontally with respect to said carriage;
    (b) guide means mounted on said welding head and extending into the joint opening, said guide means and parallelogram attachment cooperating instantaneously to continuously maintain a selected electrode-to-work distance and a selected welding head position with respect to joint irregularities.

2. The apparatus of claim 1 wherein said guide means extend through said joint and ride on the joint bottom.

References Cited

UNITED STATES PATENTS

| | | | |
|---|---|---|---|
| 2,189,399 | 2/1940 | Lewbers | 219—124 |
| 2,670,423 | 2/1954 | Darner at al. | 219—124 |
| 2,839,663 | 6/1958 | McCollom | 219—125 |
| 3,037,888 | 6/1962 | Lobosco et al. | 219—125 |
| 3,072,779 | 1/1963 | Masters et al. | 219—125 |
| 3,171,012 | 2/1965 | Morehead | 219—124 |
| 3,281,047 | 10/1966 | Weicht | 219—125 |

RICHARD M. WOOD, *Primary Examiner.*

W. DEXTER BROOKS, *Assistant Examiner.*